(12) United States Patent
Cao

(10) Patent No.: US 8,456,822 B2
(45) Date of Patent: Jun. 4, 2013

(54) SUPPORT ASSEMBLY AND COMPUTER KEYBOARD USING THE SAME

(75) Inventor: Bang-Yan Cao, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 430 days.

(21) Appl. No.: 12/752,129

(22) Filed: Apr. 1, 2010

(65) Prior Publication Data
US 2011/0084907 A1   Apr. 14, 2011

(30) Foreign Application Priority Data
Oct. 8, 2009   (CN) .......................... 2009 1 0308114

(51) Int. Cl.
*H05K 5/00* (2006.01)
*G06F 1/16* (2006.01)
*E04G 3/00* (2006.01)

(52) U.S. Cl.
USPC ................ 361/679.11; 248/286.1; 248/291.1; 248/917; 361/679.08; 361/680

(58) Field of Classification Search
USPC ................... 248/27.1, 118.5, 295.11, 222.14, 248/316.7, 918, 286.1, 291.1, 298.1, 292.13, 248/223.41, 225.11, 917, 919; 361/679.08, 361/679.11, 679.12, 680, 683, 756
See application file for complete search history.

(56) References Cited

U.S. PATENT DOCUMENTS

| | | | | |
|---|---|---|---|---|
| 3,762,275 A | * | 10/1973 | Imamura | 248/349.1 |
| 5,460,105 A | * | 10/1995 | Given, Jr. | 248/430 |
| 5,469,772 A | * | 11/1995 | Vandervoort | 84/436 |
| 5,735,512 A | * | 4/1998 | Waddell | 269/21 |
| 6,179,261 B1 | * | 1/2001 | Lin | 248/274.1 |
| 6,375,290 B1 | * | 4/2002 | Lin et al. | 312/334.46 |
| 7,314,215 B2 | * | 1/2008 | Vosoughkia | 269/296 |
| 7,426,115 B2 | * | 9/2008 | Shih et al. | 361/756 |
| 7,820,942 B1 | * | 10/2010 | Lamsfuss | 219/121.82 |
| 7,889,496 B2 | * | 2/2011 | Daley, III | 361/679.55 |
| 8,061,668 B1 | * | 11/2011 | Cvek | 248/291.1 |
| 2010/0090075 A1 | * | 4/2010 | Griffin | 248/222.14 |

* cited by examiner

*Primary Examiner* — Tan Le
(74) *Attorney, Agent, or Firm* — Altis Law Group, Inc.

(57) ABSTRACT

A support assembly includes a base, a slidable member, and a pair of positioning shafts. The base includes at least one sliding rail. The slidable member can side along the at least one sliding rail of the base. The slidable member defines a pair of blind holes facing the base. The positioning shafts can slide along the base in a direction perpendicular to the at least one sliding rail. When the slidable member is operated to slide along the at least one rail of the base, one of the positioning shafts can be pressed to slide along the direction perpendicular to the at least one sliding rail, causing one end of the one of the positioning shafts to be received in one of the blind holes.

10 Claims, 7 Drawing Sheets

SUPPORT ASSEMBLY AND COMPUTER KEYBOARD USING THE SAME

BACKGROUND

1. Technical Field

The present disclosure relates to support assemblies and computer keyboards and, particularly, to a computer keyboard using a support assembly.

2. Description of Related Art

A support assembly of a conventional computer keyboard is usually mounted on the bottom of the computer keyboard, which is not convenient for users when they want to adjust the support assembly to adjust the height of the computer keyboard.

BRIEF DESCRIPTION OF THE DRAWINGS

The components of the drawings are not necessarily drawn to scale, the emphasis instead being placed upon clearly illustrating the principles of a support assembly and a computer keyboard using the same. Moreover, in the drawings, like reference numerals designate corresponding parts throughout several views.

DETAILED DESCRIPTION

Figure 1:
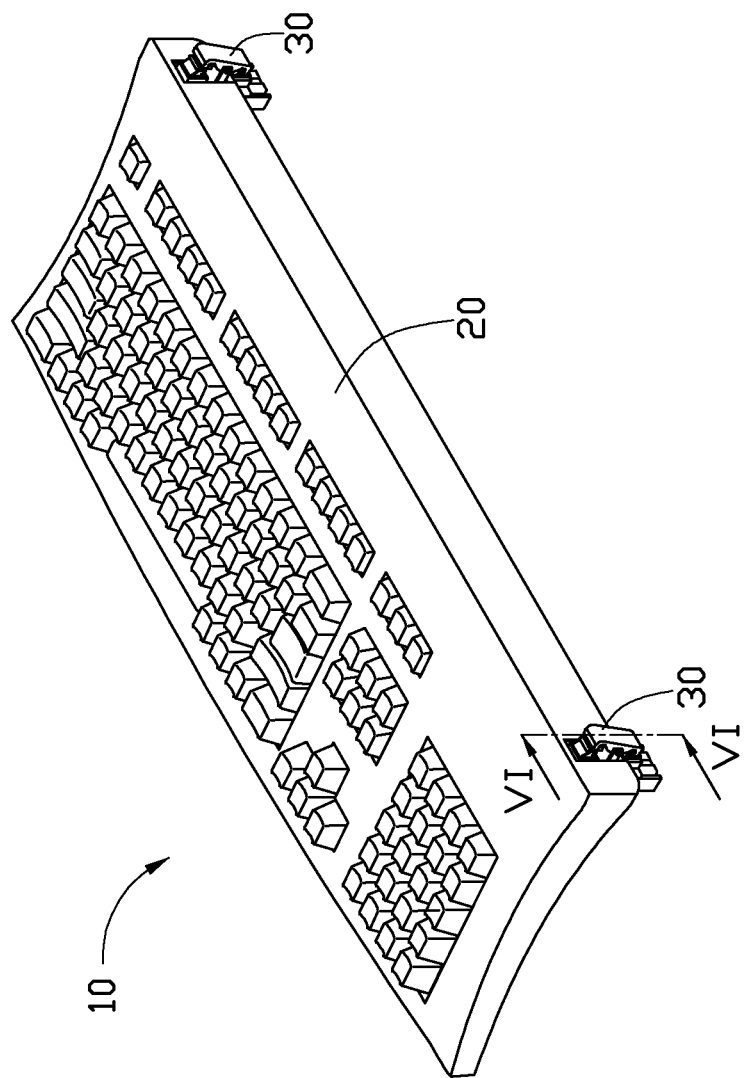
FIG. 1 is an isometric view of a computer keyboard in accordance with an exemplary embodiment, showing two support assemblies employed to support the computer keyboard.

Referring to FIG. 1, a computer keyboard 10 includes a main body 20 and a pair of support assemblies 30. A plurality of buttons (not labeled) is arranged on the main body 20. The support assemblies 30 are configured for supporting the main body 20.

Figure 2:
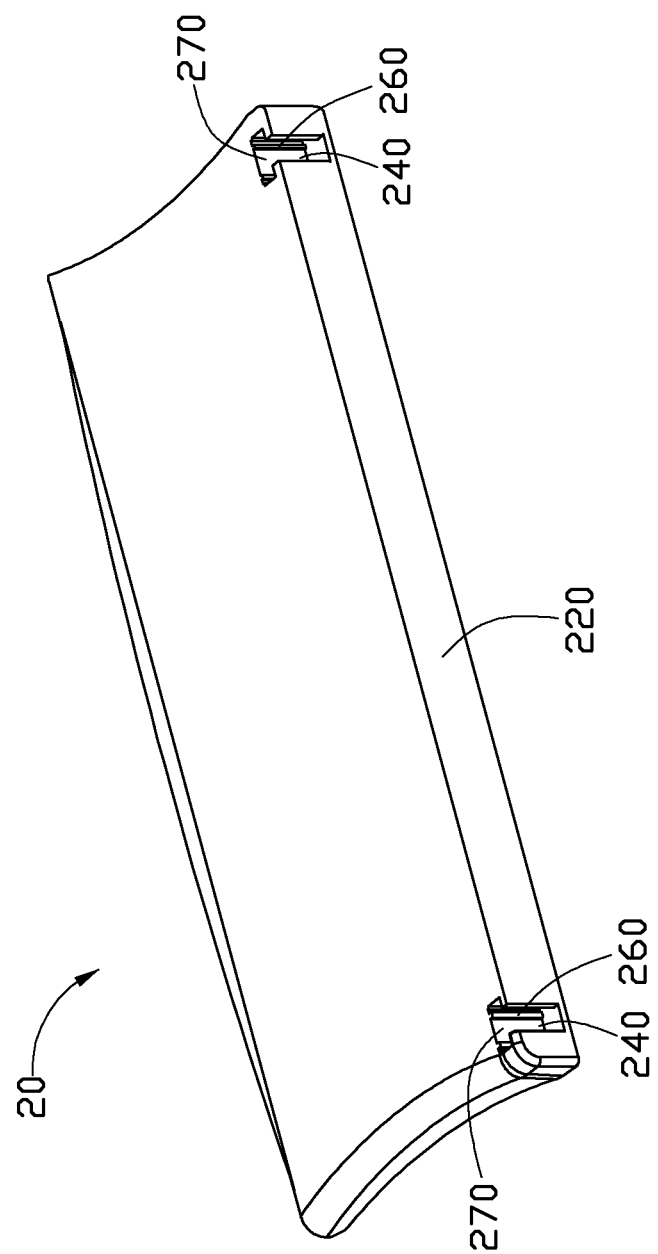
FIG. 2 is an isometric view of a main body of the computer keyboard of FIG. 1.

Referring also to FIG. 2, a sidewall 220 of the main body 20 defines a pair of receiving spaces 240. The sidewall 220 is opposite to a sidewall (not labeled) of the main body 20 facing a user. The receiving spaces 240 are spaced from each other, and each of the receiving spaces 240 is configured to receive one support assembly 30. In the embodiment, each of the receiving spaces 240 is generally rectangular. A pair of first sliding rails 260 is formed on a sidewall 270 of each of the receiving spaces 240 and spaced from each other. The first sliding rails 260 are parallel to the sidewall 220 of the main body 20. Each of the support assemblies 30 can slide along the first sliding rails 260 of one of the receiving spaces 240.

Figure 3:
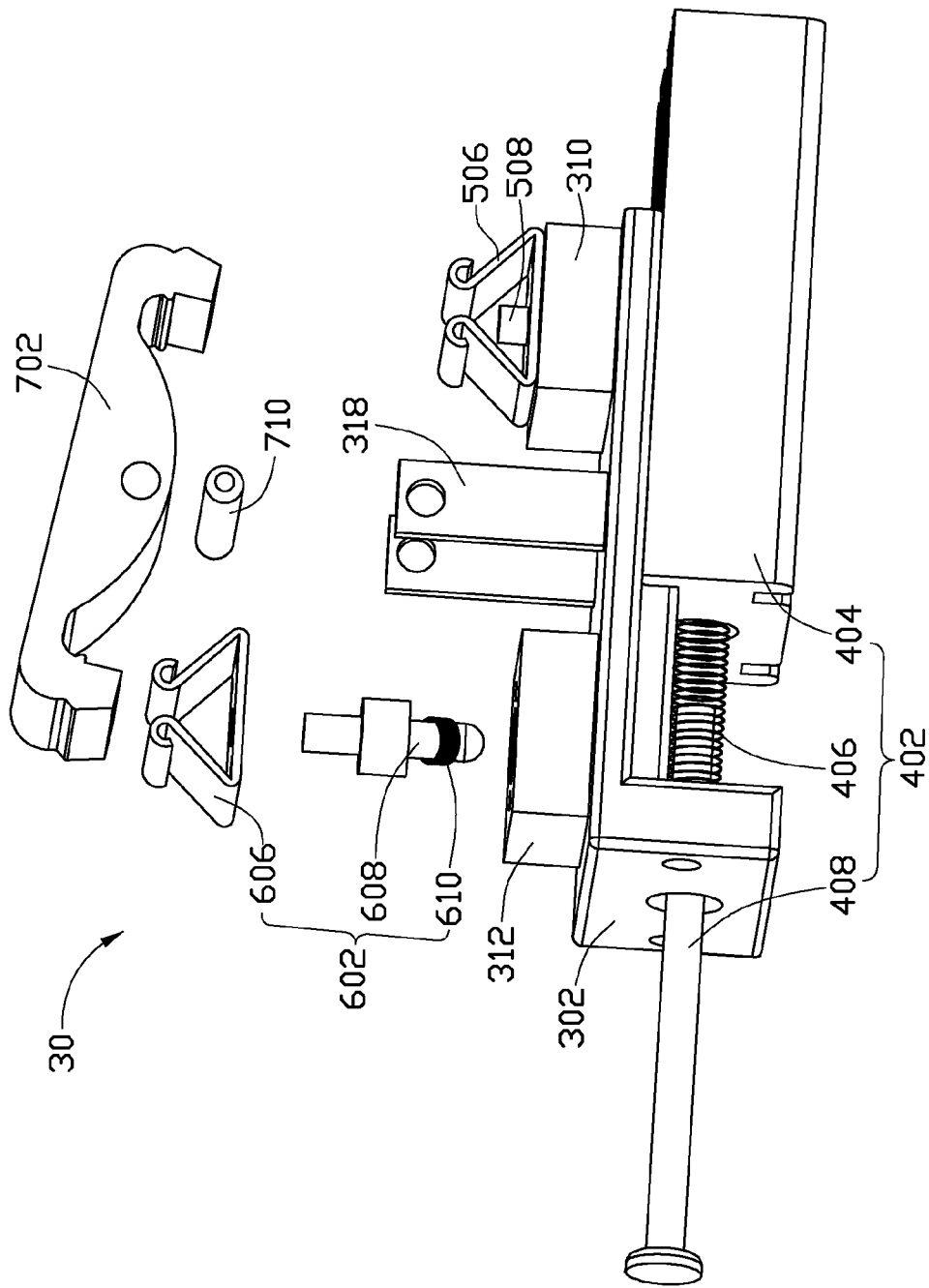
FIG. 3 is a partially exploded, perspective view of one of the support assemblies of FIG. 1.
Figure 4:
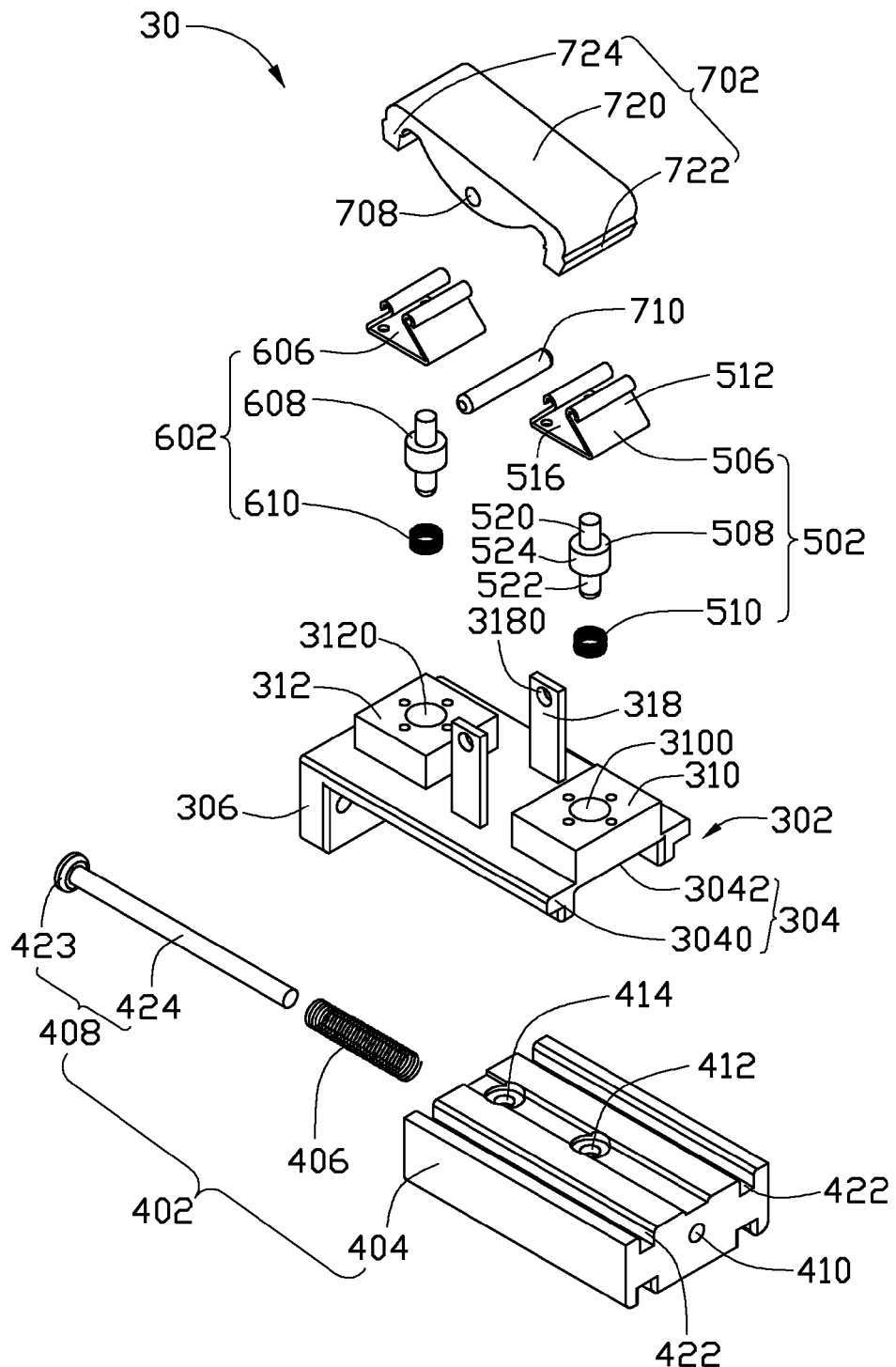
FIG. 4 is an exploded perspective view of one of the support assemblies of FIG. 1.
Figure 5:
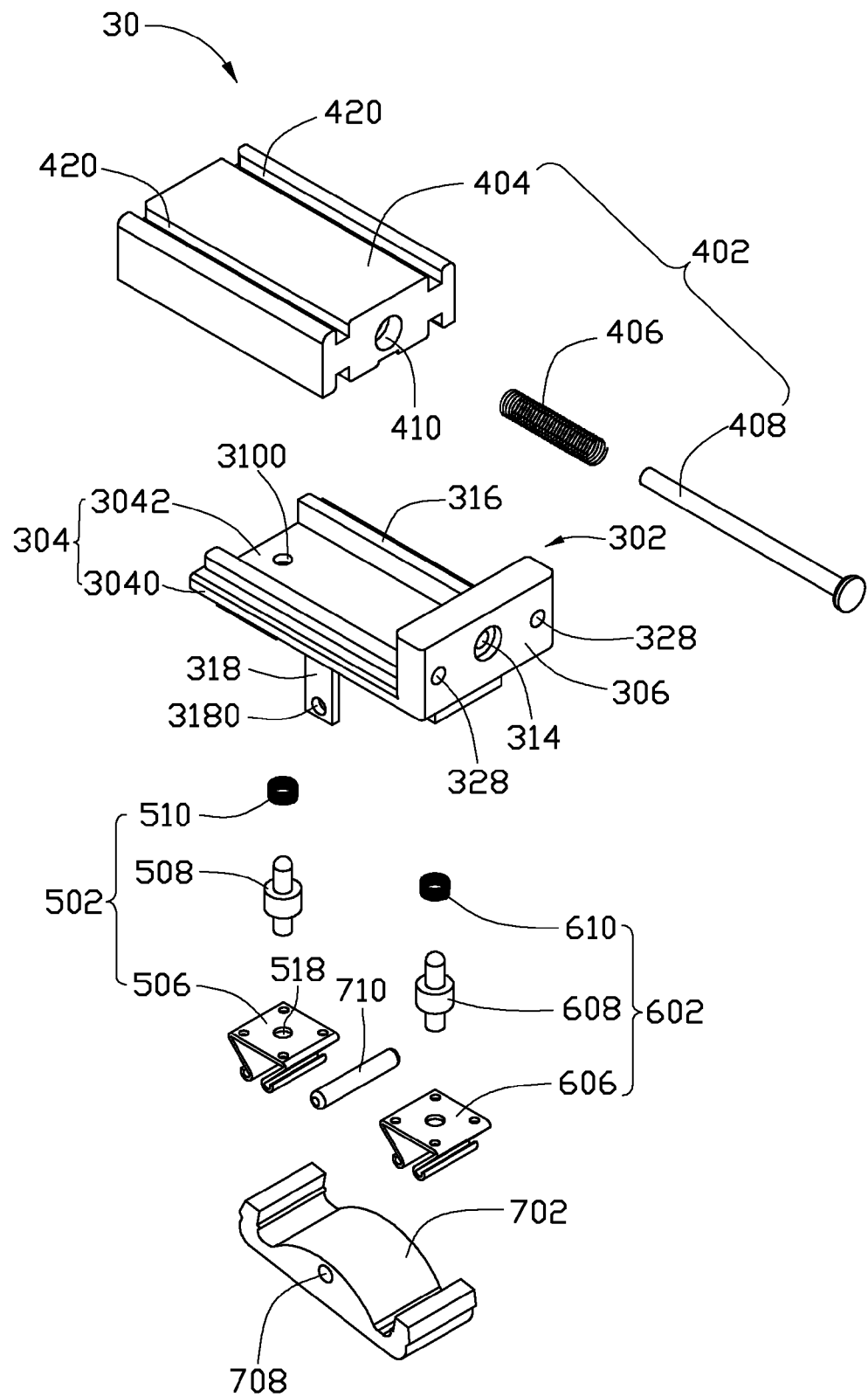
FIG. 5 is similar to FIG. 4 but from another viewpoint.

Referring also to FIGS. 3-5, each of the support assemblies 30 includes a base 302, a slidable member 402, a first positioning member 502, a second positioning member 602, an operational member 702, and a fixing shaft 710. The base 302 is secured to the sidewall 270 of the receiving space 240. The slidable member 402 is slidably connected to the base 302 and the sidewall 270. The first positioning member 502 and the second positioning member 602 are mounted on the base 302. The operational member 702 is pivotally connected to the base 302 via the fixing shaft 710.

Each of the bases 302 includes a base plate 304 and a sideboard 306 perpendicularly secured to one end of the base plate 304. The base plate 304 is substantially rectangular. The length of the base plate 304 is generally equal to or less than the height of the receiving space 240, thus when the base 302 is secured to the main body 20, the base plate 304 is retained within the receiving space 240. The base plate 304 includes a top surface 3040 and a bottom surface 3042. A pair of projections 310 and 312 protrudes from the top surface 3040. In the embodiment, the projections 310 and 312 are substantially rectangular. The projection 310 defines a first stepped hole 3100 extending through the projection 310 and the base plate 304. The projection 312 defines a second stepped hole 3120 extending through the projection 312 and the base plate 304. The larger end of the first stepped hole 3100 is defined from one end of the projection 310 to a depth just enough to accommodate a second elastic portion 510 of the first positioning member 502, and then steps to the base plate 304 to define the smaller end of the first stepped hole 3100. The larger end of the second stepped hole 3120 is defined from one of the projection 312 to a depth just enough to accommodate a third elastic portion 610 of the second positioning member 602, and then steps to the base plate 304 to define the smaller end of the second stepped hole 3120.

A pair of support arms 318 protrudes from the top surface 3040. The support arms 318 are arranged between the projections 310 and 312. Each of the support arms 318 defines a first shaft hole 3180 adapted to the fixing shaft 710. The first shaft hole 3180 of one of the support arms 318 aligns with the first shaft hole 3180 of the other support arm 318.

A pair of second sliding rails 316 protrudes from the bottom surface 3042. The second sliding rails 316 are spaced from each other and perpendicular to the sideboard 306. The slidable member 402 is moveably connected to the base 302 via being sandwiched between the base 302 and the sidewall 270 and can slide along the second sliding rails 316 and the first sliding rails 260.

The sideboard 306 defines a third stepped hole 314. The larger end of the third stepped hole 314 is defined from one end of the sideboard 306 facing the main body 20 to a depth just enough to accommodate to a head portion 423 of a guide shaft 408 of the slidable member 402. The sideboard 306 further defines a pair of fixing holes 328 employed to secure the base 302 to the main body 20. The third stepped hole 314 is between the fixing holes 328.

The slidable member 402 includes a slidable plate 404, a first elastic portion 406, and the guide shaft 408.

The slidable plate 404 is substantially rectangular. A pair of first sliding slots 420 is formed in the bottom surface of the slidable plate 404, and a pair of second sliding slots 422 is formed in the top surface of the slidable plate 404. The first sliding slots 420 are spaced from each other, and each of the first sliding slots 420 corresponds to one of the first sliding rails 260 of one of the receiving spaces 240. The second sliding slots 422 are spaced from each other, and each of the second sliding slots 422 corresponds to one of the second sliding rails 316. The top surface of the slidable plate 404 defines a first blind hole 412 and a second blind hole 414. The first blind hole 412 and the second blind hole 414 are arranged between the second sliding slots 422, and are substantially coplanar with each other. The second blind hole 414 is adjacent to the sideboard 306. The distance of the second blind hole 414 and a sidewall (not labeled) of the slidable plate 404 opposite to the sideboard 306 is generally equal to the distance between the second stepped hole 3120 and a sidewall (not labeled) of the base plate 304 opposite to the sideboard 306. The slidable plate 404 defines a fourth stepped hole 410 extending along a longitudinal side of the slidable plate 404. The larger end of the fourth stepped hole 410 is defined from one end of the slidable plate 404 facing the sideboard 306 to a depth just enough to accommodate the first elastic portion 406 of the slidable member 402.

In the embodiment, the first elastic portion 406 is a coil spring. The first elastic portion 406 can be received in the larger end of the fourth stepped hole 410. The first elastic portion 406 is placed over the guide shaft 408.

The guide shaft 408 includes the head portion 423 and a cylindrical body 424. The diameter of the head portion 423 is equal to or less than the larger diameter of the fourth stepped hole 410, and larger than the smaller diameter of the fourth stepped hole 410. The diameter of the body 424 is equal to or less than the smaller diameter of the fourth stepped hole 410. The first elastic portion 406 is placed over the body 424.

The first positioning member 502 includes a first clasp 506, a first positioning shaft 508, and the second elastic portion 510. The first clasp 506 is secured to the projection 310. The first clasp 506 includes two elastic sidewalls 512 with two ends that abut each other and a base portion 516. The ends of the first clasp 506 can be separated from each other by an external force applied thereto. The base portion 516 defines a through hole 518.

The first positioning shaft 508 is a stepped shaft. The first positioning shaft 508 includes a first shaft portion 520, a second shaft portion 522, and a third shaft portion 524. The third shaft portion 524 is between the first shaft portion 520 and the second shaft portion 522. The diameter of the third shaft portion 524 is generally equal to or less than the larger diameter of the first stepped hole 3100, and is greater than the smaller diameter of the first stepped hole 3100. The diameter of the first shaft portion 520 and the second shaft portion 522 is equal to or less than the smaller diameter of the first stepped hole 3100. The diameter of the first shaft portion 520 is generally equal to or less than that of the through hole 518.

In the embodiment, the second elastic portion 510 is a coil spring. The second elastic portion 510 is placed over the second shaft portion 522.

The structure of the second positioning member 602 is the same as that of the first positioning member 502. The positioning member 602 includes a second clasp 606, a second positioning shaft 608, and the third elastic portion 610.

The operational member 702 includes an operation portion 720 and two opposite ends 722 and 724 perpendicularly secured to the operation portion 720. The operation portion 720 defines a second shaft hole 708 adapted to the fixing shaft 710.

The following description is employed to illustrate the process of mounting one of the support assemblies 30 to the main body 20. A first step is to pass the guide shaft 408 through the third stepped hole 314 of the base 302, causing the head portion 423 of the shaft 408 to be received in the larger end of the third stepped hole 314. A second step is to secure the base 302 to the sidewall 270 of the receiving space 240, causing each of the second sliding rails 316 to correspond to one of the first sliding rails 260. A third step is to place the first elastic portion 406 on the body 424 of the guide shaft 408. A fourth step is to pass the body 424 through the fourth stepped hole 410 of the slidable plate 404, causing one end of the first elastic portion 406 to be received in the larger end of the fourth stepped hole 410, each of the first sliding slots 420 to correspond to one of the first sliding rails 260, and each of the second sliding slots 422 to correspond to one of the second sliding rails 316, thus the slidable plate 404 can slide along the first sliding rails 260 and the second sliding rails 316. A fifth step is to place the second elastic portion 510 over the second shaft portion 522 of the first positioning shaft 508 and pass the first positioning shaft 508 through the first stepped hole 3100, causing the third shaft portion 524 and the second elastic portion 510 to be received in the larger end of the first stepped hole 3100. A sixth step is to mount the first clasp 506 on the projection 310, causing the first shaft portion 520 to pass through the through hole 518. A seventh step is to mount the second positioning member 602 on the base 302 as the procedure of mounting the first positioning member 502. An eighth step is to dispose the operational member 702 between the support arms 318 of the base 302, causing the second shaft hole 708 to align with the first shaft holes 3180. The last step is to pass the fixing shaft 710 through the first shaft holes 3180 and the second shaft hole 708, thus moveably mounted the operational member 702 to the base 302.

Figure 6:
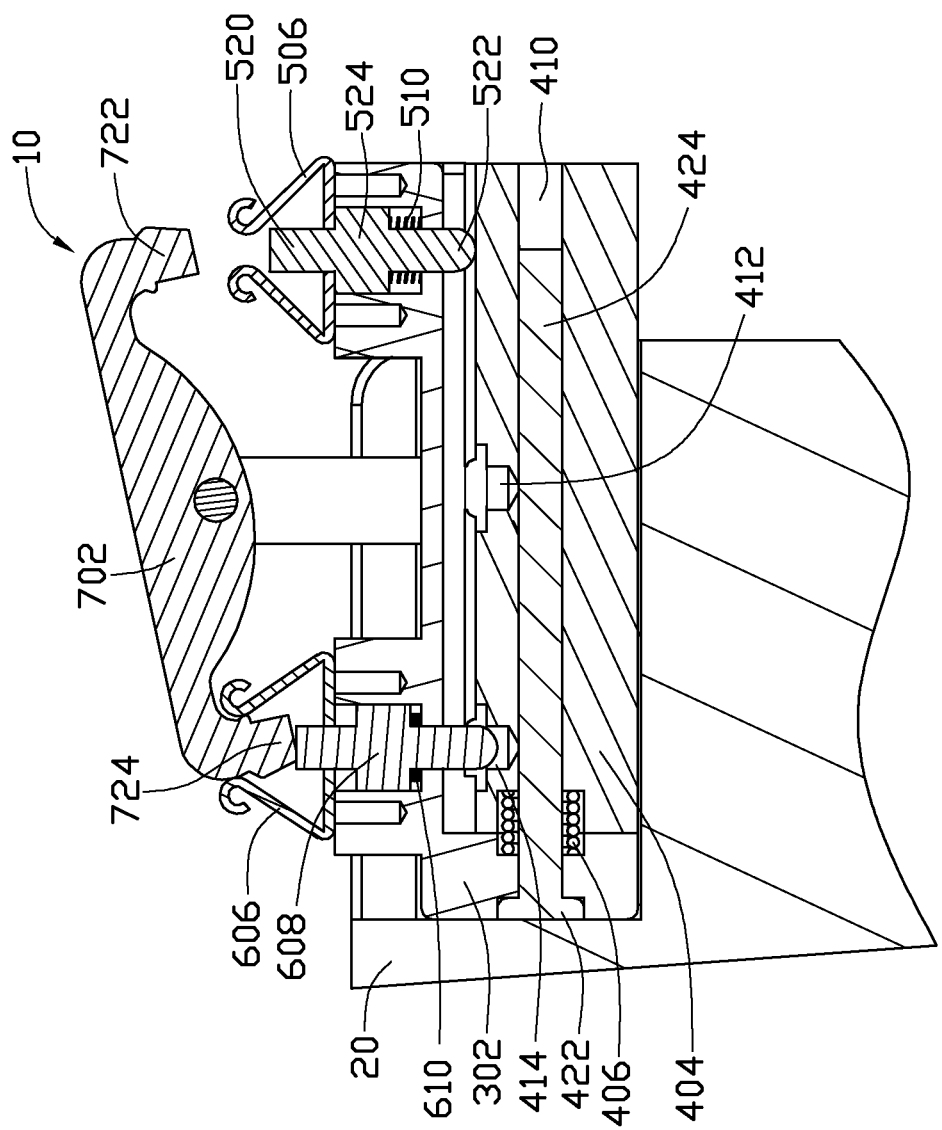
FIG. 6 is an enlarged cross-sectional perspective view taken along line VI-VI of FIG. 1, showing the computer keyboard in a flat state.

Referring also to FIG. 6, after mounting the operational member 702 to the base 302, the slidable plate 404 is pushed towards the sideboard 306, causing the first elastic portion 406 to be compressed, and the second blind hole 414 to align with the second stepped hole 3120. The operational member 702 is pressed to cause the end 724 to be received in the second clasp 606. After the end 724 is received in the second clasp 606, the operational member 702 is further pressed to cause the end 724 to press the second positioning shaft 608, causing the third elastic portion 610 to be compressed, and a portion of the second positioning shaft 608 to be received in the second blind hole 414. When a portion of the second positioning shaft 608 is received in the second blind hole 414, the slidable plate 404 is retained within the receiving space 240. Furthermore, the second clasp 606 clasps the end 724 of the operational member 702, thus the main body 20 is in a flat state.

Figure 7:
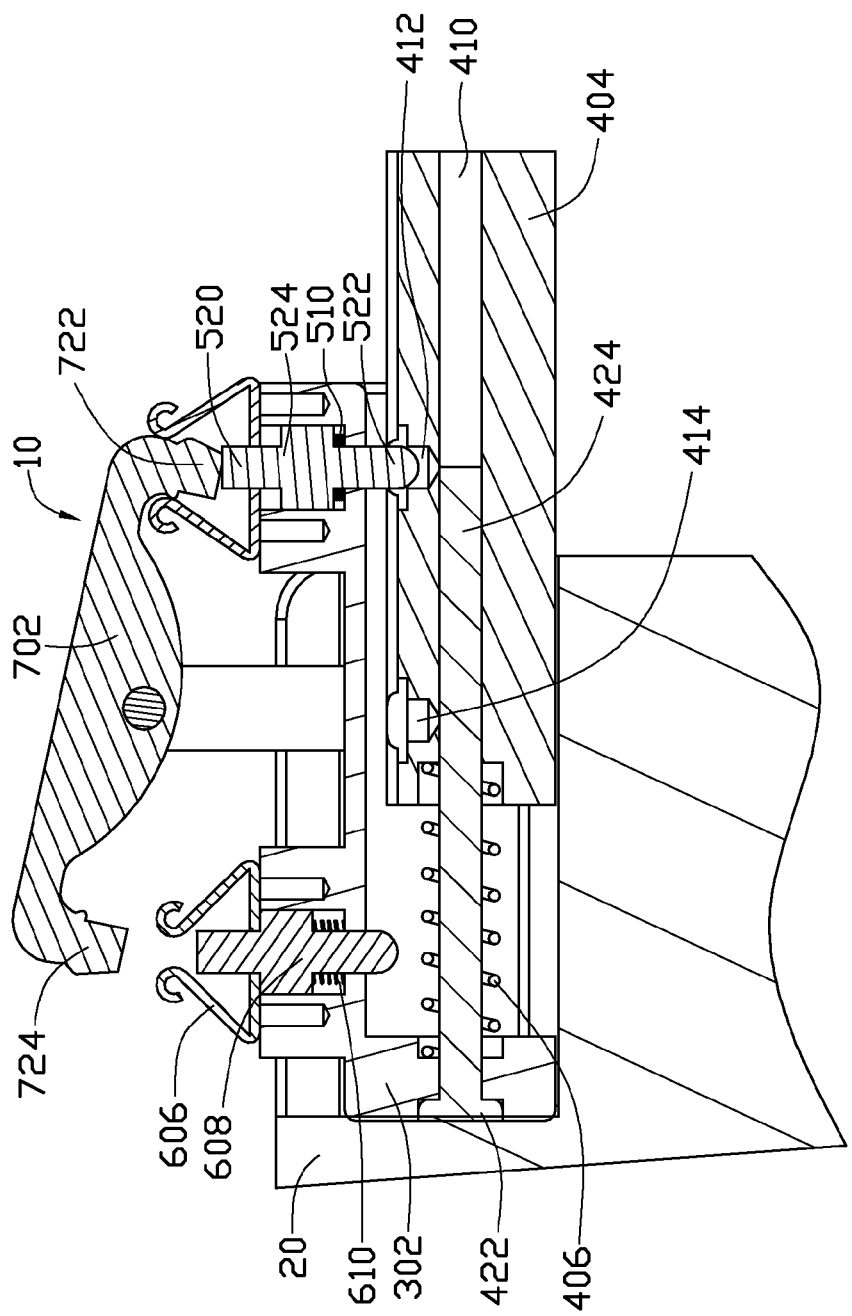
FIG. 7 is similar to FIG. 6 but showing the computer keyboard in an inclined state.

Referring also to FIG. 7, to adjust the main body 20 to stay in an inclined state, the operational member 702 is pressed to cause the end 724 to move out of the second clasp 606, and the end 722 to be received in the first clasp 506. When the end 724 moves out of the second clasp 606, the third elastic portion 610 rebounds to cause the second fixing shaft 608 to move out of the second blind hole 414, thus the slidable plate 404 slides downwards along the first sliding rails 260 and the second sliding rails 316 under the spring force of the first elastic portion 406. The operational member 702 is further pressed until a portion of the first positioning shaft 508 to be received in the first blind hole 412. When a portion of the first positioning shaft 508 is received in the first blind hole 412, the slidable plate 404 extends out of the receiving space 240. Furthermore, the first clasp 506 clasps the end 722 of the operational member 702, thus the computer keyboard 10 can be kept in the inclined state.

Although the present disclosure has been specifically described on the basis of the exemplary embodiment thereof, the disclosure is not to be construed as being limited thereto. Various changes or modifications may be made to the embodiment without departing from the scope and spirit of the disclosure.

What is claimed is:

1. A support assembly, comprising:
   a base comprising at least one sliding rail;
   a slidable member able to slide along the at least one sliding rail of the base, wherein the slidable member defines a pair of blind holes facing the base;
   a pair of positioning shafts mounted on the base to slide along in a direction perpendicular to the at least one sliding rail, wherein when the slidable member is caused to slide along the at least one sliding rail of the base, one of the positioning shafts can be pressed to slide to cause one end of the one of the positioning shafts to be received in one of the blind holes;

an operational member and a pair of clasps, wherein the operational member is movably mounted on the base, the clasps are secured to the base, each of the clasps comprises two elastic sidewalls with two ends that abut each other, one end of each of the positioning shafts passes through one of the clasps, when the operational member is pressed to cause one end of the operational member to be clasped by one of the clasps, the one end of the operational member presses one end of the positioning shaft passing through the one of the clasps, causing an opposite end of the positioning shaft to be received in one of the blind holes; and a pair of second elastic portions being placed over one end of each of the positioning shafts, wherein when one end of one of the positioning shafts is received in one of the blind holes, the second elastic portion placed over the one of the positioning shafts is compressed, and when the end of the one of the positioning shafts moves out of the one of the blind holes, the second elastic portion rebounds.

2. The support assembly as described in claim 1, wherein the slidable member comprises a slidable plate, a first elastic portion, and a guide shaft, the slidable plate can slide along the at least one sliding rail of the base, the slidable plate defines a hole extending along a direction parallel to the at least one sliding rail of the base, the guide shaft is secured to the base and passes through the hole of the slidable plate, the first elastic portion is placed over the guide shaft, one end of the first elastic portion resists the base, and an opposite end of the first elastic portion resists the slidable plate.

3. The support assembly as described in claim 2, wherein the base comprises a base plate and a sideboard perpendicularly secured to one end of the base plate, the sideboard defines a stepped hole, a smaller end of the stepped hole faces the slidable plate, the guide shaft comprises a head portion and a cylindrical body, the diameter of the head portion is equal to or less than the larger diameter of the stepped hole, and larger than the smaller diameter of the stepped hole, the diameter of the cylindrical body is equal to or less than the smaller diameter of the stepped hole, the head portion is received in the larger end of the stepped hole, and a portion of the cylindrical body is received in the smaller end of the stepped hole.

4. The support assembly as described in claim 3, wherein the hole of the slidable plate is a stepped hole, a larger end of the hole faces the sideboard, the diameter of the cylindrical body of the guide shaft is equal to or less than a smaller diameter of the hole, one end of the first elastic portion resists the sideboard, and the opposite end of the first elastic portion is received in the larger end of the hole, the cylindrical body of the guide shaft passes through the hole.

5. The support assembly as described in claim 1, wherein the base defines a pair of stepped holes, a smaller end of each of the stepped holes faces the slidable member, each of the positioning shafts comprises a first shaft portion, a second shaft portion, and a third shaft portion, the third shaft portion is between the first shaft portion and the second shaft portion, the diameter of the first shaft portion and the second shaft portion is equal to or less than the smaller diameter of each of the stepped holes, the diameter of the third shaft portion is equal to or less than the larger diameter of each of the stepped holes, and larger than the smaller diameter of each of the stepped holes, each of the first shaft portions passes through one of the clasps, each of the second elastic portions is placed over each of the second shaft portions, each of the third shaft portions and the second elastic portions are received in the larger end of each of the stepped holes, each of the second shaft portions can be received in one of the blind holes.

6. A computer keyboard, comprising:
a main body; and
a support assembly comprising:
a base secured to the main body and comprising at least one sliding rail;
a slidable member able to side along the at least one sliding rail of the base, wherein the slidable member defines a pair of blind holes facing the base;
a pair of positioning shafts mounted on the base to slide along in a direction perpendicular to the at least one sliding rail, wherein when the slidable member is operated to slide along the at least one sliding rail of the base, one of the positioning shafts can be pressed to slide to cause one end of the one of the positioning shafts to be received in one of the blind holes;

an operational member and a pair of clasps, wherein the operational member is movably mounted on the base, the clasps are secured to the base, each of the clasps comprises two elastic sidewalls with two ends that abut each other, one end of each of the positioning shafts passes through one of the clasps, when the operational member is operated to cause one end of the operational member to be clasped by one of the clasps, the one end of the operational member presses one end of the positioning shaft passing through the one of the clasps, causing an opposite end of the positioning shaft to be received in one of the blind holes; and a pair of second elastic portions being placed over one end of each of the positioning shafts, wherein when one end of one of the positioning shafts is received in one of the blind holes, the second elastic portion placed over the one of the positioning shafts is compressed, and when the end of the one of the positioning shafts moves out of the one of the blind holes, the second elastic portion rebounds.

7. The computer keyboard as described in claim 6, wherein the slidable member comprises a slidable plate, a first elastic portion, and a guide shaft, the slidable plate can slide along the at least one sliding rail of the base, the slidable plate defines a hole extending along a direction parallel to the at least one sliding rail of the base, the guide shaft is secured to the base and passes through the hole of the slidable plate, and the first elastic portion is placed over the guide shaft, one end of the first elastic portion resists the base, and an opposite end of the first elastic portion resists the slidable plate.

8. The computer keyboard as described in claim 7, wherein the base comprises a base plate and a sideboard perpendicularly secured to one end of the base plate, the sideboard defines a stepped hole, a smaller end of the stepped hole faces the slidable plate, the guide shaft comprises a head portion and a cylindrical body, the diameter of the head portion is equal to or less than the larger diameter of the stepped hole, and larger than the smaller diameter of the stepped hole, the diameter of the cylindrical body is equal to or less than the smaller diameter of the stepped hole, the head portion is received in the larger end of the stepped hole, and a portion of the cylindrical body is received in the smaller end of the stepped hole.

9. The computer keyboard as described in claim 8, wherein the hole of the slidable plate is a stepped hole, a larger end of the hole faces the sideboard, the diameter of the cylindrical body of the guide shaft is equal to or less than the smaller diameter of the hole, one end of the first elastic portion resists the sideboard, and the opposite end of the first elastic portion is received in the larger end of the hole, the cylindrical body of the guide shaft passes through the hole.

10. The computer keyboard as described in claim 6, wherein the base defines a pair of stepped holes, a smaller end of each of the stepped holes faces the slidable member, each of the positioning shafts comprises a first shaft portion, a second shaft portion, and a third shaft portion, the third shaft portion is between the first shaft portion and the second shaft portion, the diameter of the first shaft portion and the second shaft portion is equal to or less than the smaller diameter of each of the stepped holes, the diameter of the third shaft portion is equal to or less than the larger diameter of each of the stepped holes, and larger than the smaller diameter of each of the stepped holes, each of the first shaft portions passes through one of the clasps, each of the second elastic portions is placed over each of the second shaft portions, each of the third shaft portions and the second elastic portions are received in the larger end of each of the stepped holes, each of the second shaft portions can be received in one of the blind holes.

\* \* \* \* \*